(12) United States Patent
Conrads

(10) Patent No.: US 12,215,990 B2
(45) Date of Patent: *Feb. 4, 2025

(54) METHOD AND DEVICE FOR MEASURING A FLOW VELOCITY OF A GAS STREAM

(71) Applicant: PROMECON PROCESS MEASUREMENT CONTROL GMBH, Barleben (DE)

(72) Inventor: Hans-Georg Conrads, Hannover (DE)

(73) Assignee: PROMECON PROCESS MEASUREMENT CONTROL GMBH, Barleben (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,714

(22) Filed: Feb. 8, 2024

(65) Prior Publication Data

US 2024/0255333 A1 Aug. 1, 2024

Related U.S. Application Data

(63) Continuation of application No. 17/278,937, filed as application No. PCT/EP2019/075710 on Sep. 24, 2019, now Pat. No. 11,953,358.

(30) Foreign Application Priority Data

Sep. 24, 2018 (DE) .................. 10 2018 123 448.1

(51) Int. Cl.
*G01F 1/704* (2006.01)
*G01F 1/7086* (2022.01)
*G01F 1/712* (2006.01)

(52) U.S. Cl.
CPC .......... *G01F 1/7086* (2013.01); *G01F 1/7044* (2013.01); *G01F 1/712* (2013.01)

(58) Field of Classification Search
CPC .... G01F 1/7086; G01F 1/7042; G01F 1/7044; G01F 1/7046; G01F 1/7048
See application file for complete search history.

(56) References Cited

U.S. PATENT DOCUMENTS 11,953,358 B2 * 4/2024 Conrads .................. G01F 1/704
2004/0113081 A1 * 6/2004 Hyde ...................... G01F 1/712
250/345

* cited by examiner

*Primary Examiner* — Paul M. West
(74) *Attorney, Agent, or Firm* — WC&F IP

(57) ABSTRACT

The invention relates to a method for measuring a flow velocity (v) of a gas stream (14) featuring the steps: (a) time-resolved measurement of an IR radiation parameter (E) of IR radiation of the gas stream (14) at a first measurement point (P1) outside of the gas stream (14), thereby obtaining a first IR radiation parameter curve ($E_{g1,1}(t)$), (b) time-resolved measurement of an IR radiation parameter (E) at a second measurement point (P2) outside of the gas stream (14), thereby obtaining a second IR radiation parameter curve ($E_{g1,2}(t)$), (c) calculation of a transit time ($\tau 1$) from the first IR radiation parameter curve ($E_{g1,1}(t)$) and the second IR radiation parameter curve ($E_{g1,2}(t)$), in particular by means of cross-correlation, and (d) calculation of the flow velocity (vG) from the transit time ($\tau 1$), (e) wherein the IR radiation parameter ($E_{g1}$) is measured photoelectrically at a wavelength (g1) of at least 780 nm, and (f) a measurement frequency (f) is at least 1 kilohertz.

14 Claims, 3 Drawing Sheets

METHOD AND DEVICE FOR MEASURING A FLOW VELOCITY OF A GAS STREAM

Figure 1:
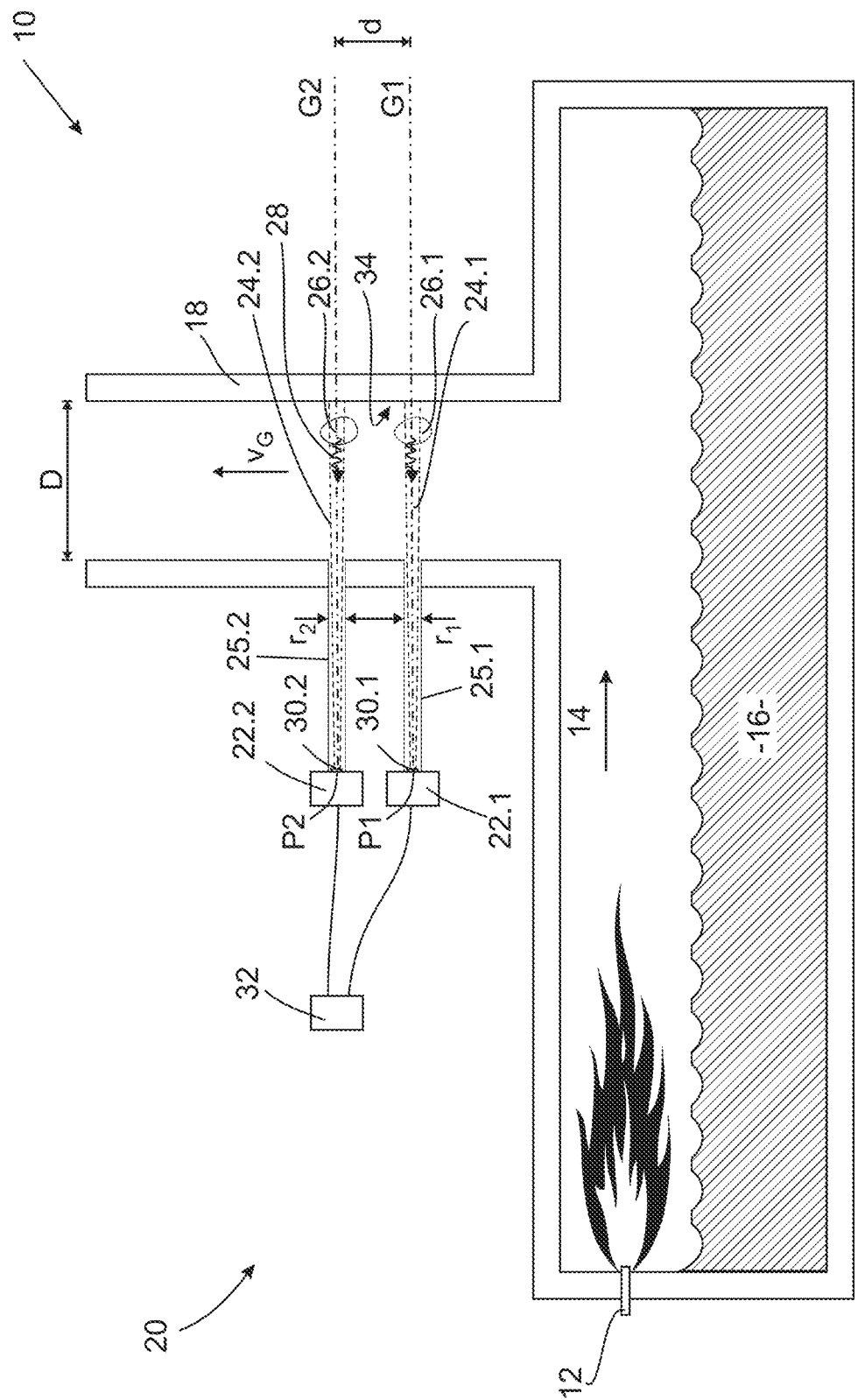

The invention relates to a method for measuring a flow velocity of a gas stream. According to a second aspect, the invention relates to a device for measuring a flow velocity of a gas stream, with (a) a first IR radiation sensor for the time-resolved measurement of a first IR radiation parameter of IR radiation of the gas stream to obtain an IR radiation parameter curve, (b) a second IR radiation sensor for measuring a second IR radiation parameter of IR radiation of the gas stream to obtain a second IR radiation parameter curve, and (c) an evaluation unit that is designed to automatically calculate a transit time between the first IR radiation parameter curve and the second IR radiation parameter curve, in particular by means of cross-correlation, and calculation of the flow velocity from the transit time.

The flow velocity of gases must be measured at numerous occasions. This task of measuring is particularly challenging if the gases are very hot and/or aggressive. In the case of high temperatures, for example over 1000° C., it is necessary to use materials that are resistant to high temperatures, which is expensive. Aggressive gases lead to an increase in wear. For example, if the gas stream transports solid particles, such as ash, carbon, slag or cement particles, it can result in significant abrasive wear of the measuring device in use. If the gas contains oxidising components, for instance, it may also result in chemical wear. Despite potential adverse ambient conditions, a high degree of measurement accuracy is desired, as this leads to an improvement in the controllability of the technical installation in which the flow velocity is measured.

It is known practice to measure temperature fluctuations in the gas stream at points situated at a distance from one another and to determine the temporal offset of the two temperature curves by means of cross-correlation. The flow velocity of the gas stream can be determined from the time offset and the distance of the two measurement points.

The disadvantage of this method for measuring the flow velocity is that it is difficult to achieve high degrees of accuracy.

DE 699 21 009 T2 describes an optical flowmeter, specifically for natural gas pipelines, in which scattered light is measured on particles. If the particle concentration is too low, more particles are added.

DE 38 27 913 A1 describes a method and a device for determining the velocity of a flow that comprises the measurement of scattered light on particles. The respective measuring points are situated apart from one another. The velocity is obtained using a correlation calculation of the measurement results.

U.S. Pat. No. 9,157,778 B2 details a method for measuring the gas flow, in which the absorption of radiation at two measurement points at a distance from one another is measured. The flow velocity is calculated by determining the transit time of a disturbance. This disturbance can be caused, for instance, by the injection of gas.

The invention aims to improve the measurement of the flow velocity of a gas stream.

The invention solves the problem by way of a method comprising the steps (a) time-resolved measurement of an IR radiation parameter of IR radiation of the gas stream at a first measurement point outside of the gas stream, thereby obtaining a first IR radiation parameter curve, (b) time-resolved measurement of the IR radiation parameter at a second measurement point outside of the pipe, thereby obtaining a second IR radiation parameter curve, (c) calculation of a transit time from the first IR radiation parameter curve and the second IR radiation parameter curve, in particular by means of cross-correlation, and (d) calculation of the flow velocity from the transit time, wherein (e) the IR radiation parameter is measured photoelectrically at a wavelength of at least 780 nm, especially 1.5 μm.

According to a second aspect, the invention solves the problem by way of a device according to the preamble in which the IR radiation sensors are photoelectric IR radiation sensors and have a measurement range whose lower limit is at least 0.78 μm and a measurement frequency of at least 1 kilohertz.

The advantage of the invention is that the flow velocity can be measured to a higher degree of accuracy. The reason for this is that an absolute photoelectric measurement of the IR radiation parameter is possible; in the case of a pyrometric measurement, for instance, this is generally only possible if the emission coefficient is constant, which often cannot be guaranteed.

It is especially beneficial if the IR radiation parameter is measured at a wavelength of at least 0.78 μm, in particular at least 1.5 μm. In this case, the influence of black-body radiation is utilised effectively. Black-body radiation can arise, for example, from the walls of a pipe which conducts the gas stream or from particles in the gas stream. Gases with excitation wavelengths above 1.5 μm absorb and re-emit in this wavelength range, the background black-body radiation, such that fluctuations in the gas concentrations are particularly pronounced. The time-constant background is, for example, irrelevant in a calculation using cross-correlation.

It is beneficial if the IR radiation parameter is measured at a wavelength of at most 6 μm, in particular at most 5.3 μm. It has been shown that a particularly high degree of measurement accuracy for the flow velocity can be achieved in this way.

The invention is based on the knowledge that local fluctuations or inhomogeneities in the IR radiation parameter are similar for so long that these fluctuations move at the same velocity as the gas stream itself. These fluctuations can have several causes. First, it may be a matter of thermal fluctuations, meaning that the temperature of the gas stream is spatially inhomogeneous at a given time. If this inhomogeneity moves with the flow velocity of the gas stream, the flow velocity can be inferred from the temperature fluctuations.

If the gas is a mixture of different gases, i.e. if the gas is provided as a gas mixture in accordance with a preferred embodiment, fluctuations in the concentration of the gases can occur. The spatial distribution of the gas concentration has been proven to be more stable locally than the temperature distribution. The reason for this could be that three mechanisms to balance out differences in temperature are known, namely mixing, thermal conduction and thermal radiation. Conversely, fluctuations in concentration can only be balanced out by diffusion. The local distribution of differences in concentration is therefore more stable in terms of time. As a result, the first IR radiation parameter curve and the second IR radiation parameter curve are more similar to each other, so that the calculation of the transit time can be achieved with a lower degree of measurement uncertainty.

Within the scope of the present description, the term IR radiation parameter should be understood to mean a value or vector that indicates the irradiance of the electromagnetic infrared radiation caused by the IR radiation of the gas stream in a measurement interval. If the density, temperature and composition of the gas stream changes, so does the IR radiation parameter.

The gas stream preferably flows in a pipe and the IR radiation parameter is measured from a measurement point outside of the pipe. Alternatively, it is also possible for the gas stream to spread freely, for example to flow out of an outflow opening and escape into the surroundings or a larger cavity.

The measurement frequency is preferably at least 1.5 kilohertz, especially preferably at least 16 kilohertz. As a general rule, the higher the measurement frequency, the lower the degree of measurement uncertainty used to determine the transit time.

However, to date there have been limits to increasing the measurement frequency, as the prior art only uses pyrometric measurements, but not photoelectric ones.

Preferably, the radiation parameter is measured in analogue but then digitalised, the bit depth preferably being 16 bit.

According to a preferred embodiment, the gas stream is a stream of a gas mixture that contains a first gas and at least a second gas, wherein the first gas has a first gas excitation wavelength and wherein the IR radiation parameter is an irradiance of an IR radiation sensor at the first gas excitation wavelength. The first gas may be, for example, water vapour, nitrous oxide, methane, carbon dioxide, carbon monoxide, sulphur oxide or sulphur trioxide, NOx, $H_2S$, HF, $NH_3$ and all IR active molecules. The second gas is a different gas to the first gas and is also, for example, water vapour, nitrous oxide, methane, carbon dioxide, carbon monoxide, sulphur oxide or sulphur trioxide.

The feature that the IR radiation parameter is an irradiance at the first gas excitation wavelength should be understood particularly to mean that a change in the concentration of the first gas leads, under conditions that otherwise remain the same, to a change in the IR radiation parameter. Preferably, radiation components are filtered out that lie outside of a predetermined measurement interval which contains the first gas excitation wavelength. The interval width of this measurement interval is preferably smaller than 0.5 μm, preferably smaller than 0.4 μm.

Preferably, the second gas has a second gas excitation wavelength and the method comprises the steps (a) time-resolved detection of a second IR radiation parameter in the form of an irradiance at the second gas excitation wavelength at the first measurement point, thereby obtaining a first irradiance curve, (b) time-resolved detection of the second IR radiation parameter at the second measurement point, thereby obtaining a second irradiance curve, (c) calculation of a second transit time between the irradiance curves, particularly by means of cross-correlation, and (d) calculation of the flow velocity from the first transit time and the second transit time. In other words, the transit times are measured using two different fluctuations in concentration. The advantage of this is that the degree of measurement uncertainty can be reduced.

The IR radiation of the gas stream that does not lie within a predetermined measurement interval of, for instance, ±0.3 μm around the first gas excitation wavelength or within a predetermined interval of ±0.3 μm around the second gas excitation wavelength is preferably filtered out. It is especially preferable if the IR radiation is filtered out that does not lie in predetermined intervals of ±0.2 μm around the respective excitation wavelength. The advantage of this is that the degree of measurement uncertainty can be further reduced, as there are fewer overlaps with other fluctuating radiation components, which can lead to an averaging effect.

A temperature of the gas stream is preferably at least 200°, especially preferably at least 1000° C. The advantages of the invention are particularly evident at high temperatures.

An indium arsenide antimonide detector is preferably used to measure the IR radiation parameter. Alternatively or additionally, a mercury cadmium telluride detector can be used.

With a device according to the invention the measurement range of the IR radiation sensors preferably lies between 1 and 6 μm, particularly between 1.5 and 6 μm.

It is beneficial if the evaluation unit is configured to automatically conduct a method according to the invention. This should be understood to mean that the evaluation unit automatically conducts the method without human intervention.

It is beneficial if the device features a pipe for conducting the gas stream, wherein the first IR radiation sensor and the second IR radiation sensor are arranged to detect IR radiation outside of the pipe. In particular, the IR radiation sensors are arranged outside of the pipe. If the temperature of the gas stream during operation of the device is greater than 200° C., the IR radiation sensors are preferably arranged at such a distance from the gas stream that the temperature at that point is at most 100° C., preferably at most 80° C. Arranging the IR radiation sensors at a distance from the gas stream has the additional advantage that the chemical and/or abrasive wear can be rendered negligibly small.

Preferably, the device according to the invention has (a) a first measuring line that extends transversely to the pipe of the gas stream and is designed to conduct a first IR radiation bundle from the gas stream to the first IR radiation sensor, (b) a second measuring line that extends transversely to the pipe and is designed to conduct a second IR radiation bundle from the gas flow to the second IR radiation sensor, the measuring lines being arranged in such a way that the IR radiation bundles form a misalignment angle φ of at most 45°, particularly at most 20°, preferably at most 10°. In this way, the turbulence patterns at the first measurement point and the second measurement point are particularly similar to one another, thereby ensuring that a low degree of measurement uncertainty of the flow velocity can be achieved.

Preferably, the IR radiation sensors are not sensitive below a wavelength of 1.5 μm, preferably below 780 nm. This should be understood to mean that the spectral sensitivity below this wavelength is at most one third, in particular at most one tenth, of the maximum spectral sensitivity. The spectral sensitivity is given in amps per watt.

Preferably, the IR radiation sensors are also no longer sensitive above 15 μm, preferably above 5.5 μm. Vibration excitation wavelengths of commonly occurring gases, such as carbon dioxide, carbon monoxide and water, lie in the wavelength interval between 1.5 and 6 μm. At the same time, as mentioned above, the black-body background radiation is sufficiently intensive to obtain a good signal-to-noise ratio.

The IR radiation sensors are preferably arranged so that a maximum diameter of the IR radiation bundle is a maximum of 200 millimetres. The smaller the diameter of the IR radiation bundle, the less fluctuations are averaged and the more the signal fluctuates. It is beneficial if the minimum diameter of the IR radiation bundle is at least 1 millimetre. If the diameter of the IR radiation bundle becomes too small, the signal-to-noise ratio deteriorates.

Preferably, (a) the first IR radiation sensor is arranged such that the first IR radiation bundle extends in a first straight line, (b) the second IR radiation sensor is arranged such that the second IR radiation bundle extends along a second straight line and a line of minimum distance between both straight lines extends in the direction of flow. The distance between the two straight lines is the measuring distance. The measuring distance is preferably at least 50 to 1000 millimetres, particularly at most 600. It is also beneficial is the measuring distance is at most 600 millimetres.

It is especially favourable if the two straight lines extend parallel in the technical sense, meaning that ideally parallelism in the mathematical sense is favourable but usually cannot be achieved. Therefore, deviations of, for instance, ±5° are tolerable.

The measuring distance between the two straight lines preferably corresponds to the quotient from the flow velocity and 1000 hertz and/or at most the quotient from the flow velocity and 100 hertz. At this distance, the degree of measurement uncertainty when determining the flow velocity is already very low due to the degree of uncertainty with the transit time. Furthermore, the degree of uncertainty caused by a change in the inhomogeneity pattern is not yet so great as to negatively influence the degree of measurement uncertainty too significantly.

The device preferably does not protrude into the pipe. This should be understood to mean that no part of the device protrudes more than one tenth into the cross-section of the pipe. Systems known from the prior art often feature lances that generate turbulence in the gas stream. The disadvantage of this is that it causes a decrease in flow velocity and therefore a decrease in the efficiency of the monitored installation. In other words, the IR radiation parameters are preferably measured on an undisturbed or not actively disturbed gas stream.

In the following, the invention will be explained in more detail by way of the attached figures. They show FIG. 1 a device according to the invention for conducting a method according to the invention according to a first embodiment, and FIG. 2 a device according to the invention for conducting a method according to the invention according to a second embodiment.

Figure 3:
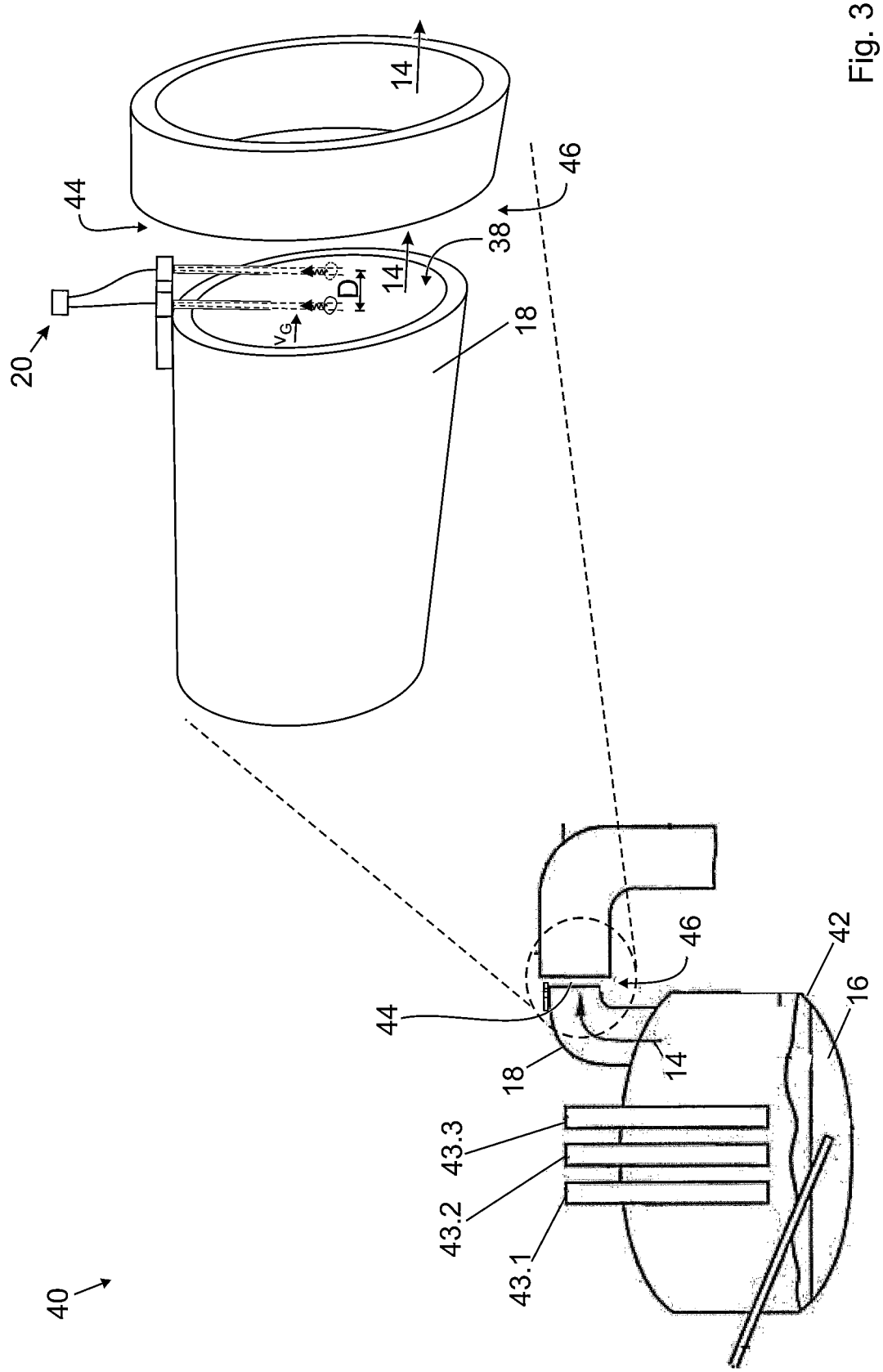

FIG. 3 depicts a device according to the invention for conducting a method according to the invention according to a third embodiment.

FIG. 1 shows a furnace 10 in which a gas stream 14, in this case in the form of an exhaust gas stream, is produced by combustion or other exothermic processes or external heat supply of a fuel by means of a burner 12. A temperature T of the gas stream 14 is above T=1400° C., for example. As in the present case, the furnace 10 can be a device for heating a metal bath or a glass bath 16. The furnace may also, for instance, be part of a power plant or cement plant. A furnace, power plant or cement plant with a measurement device according to the invention is also a subject of the present invention. The gas stream 14 runs through a pipe 18.

FIG. 1 also depicts a measurement device 20 for measuring a flow velocity vG of the gas stream 14. The flow velocity vG is the average flow velocity which, when multiplied with a cross-sectional area A of the pipe 18, gives the volumetric flow of gas. In the present case, the pipe is circular, so that the cross-sectional area results in $A=\pi D^2/4$.

The measurement device 20 comprises an IR radiation sensor 22.1 and a second IR radiation sensor 22.2. The first IR radiation sensor 22 is arranged to detect a first IR radiation bundle 24.1 that spreads through a measuring line 25.1.

If a schematically depicted molecule 26.1 situated in the first IR radiation bundle 24.1 emits an IR photon 28 which moves in the first IR radiation bundle 24.1 towards the first IR radiation sensor 22.1, it reaches a sensor element 30.1 in the form of an InAsSb photodetector, which subsequently generates a voltage. The photovoltage $U_1$ generated by the sensor element 30.1 thus depends on the irradiance of the radiation falling on the sensor element 30.1. The sensor element 30.1 is arranged at a distance from the pipe 18.

The measuring line 25.1 does not protrude into the pipe 18, thereby largely preventing the creation of additional turbulence.

The sensor element 30.1 has a measurement range $M=[\lambda_{min}, \lambda_{max}]$ with a lower cut-off wavelength $\lambda_{min}$ and an upper cut-off wavelength $\lambda_{max}$. In the present case, $\lambda_{min}=0.78$ μm and $\lambda_{max}=5.3$ μm.

The IR radiation sensor 22.1 measures an IR radiation parameter curve $E_{g1,1}(t)$ as a function of the time t with a measurement frequency $f_{mess}$ of at least 1 kHz, in the present case of $f_{mess}=16$ kHz. It is favourable if the measurement frequency $f_{mess}$ is a maximum of 1 MHz. The analogue raw data is converted into digital values by an analogue-digital converter of the radiation sensor 22.1. The bit depth of the sampling is 8 to 24, preferably 16 bit.

The second IR radiation sensor 22.2 is designed to measure radiation from an IR radiation bundle 24.2 that spreads in a second measuring line 25.2. The IR radiation of the second IR radiation bundle 24.2 comes, for example, from a second molecule 26.2. The first IR radiation bundle 24.1 extends along a first straight line G1; the second IR radiation bundle 24.2 extends along a second straight line G2. The two straight lines G1, G2 are at a measuring distance d from one another. As depicted in the present case, they preferably run parallel to one another.

The measuring distance d is preferably at most 500 millimetres, for example 350±50 millimetres.

The photovoltages $U_1$, $U_2$ generated by the respective sensor elements 30.1, 30.2 are directed to an evaluation unit 32. The photovoltage $U_1$ is a measure of an irradiance $E_1$ measured by the sensor element 30.1 and constitutes an IR radiation parameter. The irradiance $E_2$ is measured by the second sensor element 30.2 and is also time-dependent.

The evaluation unit 32 calculates a transit time t as the time at which the cross-correlation function $R_{E1,E2}(\tau')=E_1 \otimes E_2(\tau')$ reaches its maximum, wherein $\otimes$ is the operator symbol for the cross-correlation.

If a local concentration c of a first gas g1, such as methane, water, carbon dioxide, carbon monoxide, sulphur trioxide, sulphur dioxide or nitrous oxide, fluctuates in the exhaust gas stream 14, this results in a change in irradiance $E_{g1,1}$ when the corresponding fluctuation moves through the area of the first IR radiation bundle 24.1. Spatial inhomogeneities of the concentration remain largely constant over the measuring distance d, thereby resulting in similar curves of the respective irradiances $E_{g1,1}(t)$ and $E_{g1,2}(t)$ on first sensor element 30.1 and the sensor element 30.2.

Black-body radiation emanating from a wall 34 in the pipe 18 does not disturb this measurement. If, for example, $H_2O$ is selected as a first gas, it has a first gas excitation wavelength $\lambda_{g1}$ of 3.2 μm. In this case, it is beneficial if the IR radiation sensors 22.1, 22.2 have a measurement interval of $M=[\lambda_{g1}-0.3$ μm, $\lambda_{g1}+0.3$ μm$]$.

If, as provided for by a preferred embodiment, a second gas g2 is selected, whose second gas excitation wavelength $\lambda_{g2}$ does not lie in the measurement interval M for the first gas g1, the degree of measurement accuracy can often be increased. For instance, carbon dioxide can be used as a second gas, whose second gas excitation wavelength is $\lambda_{g2}$=4.27 μm.

Figure 2:
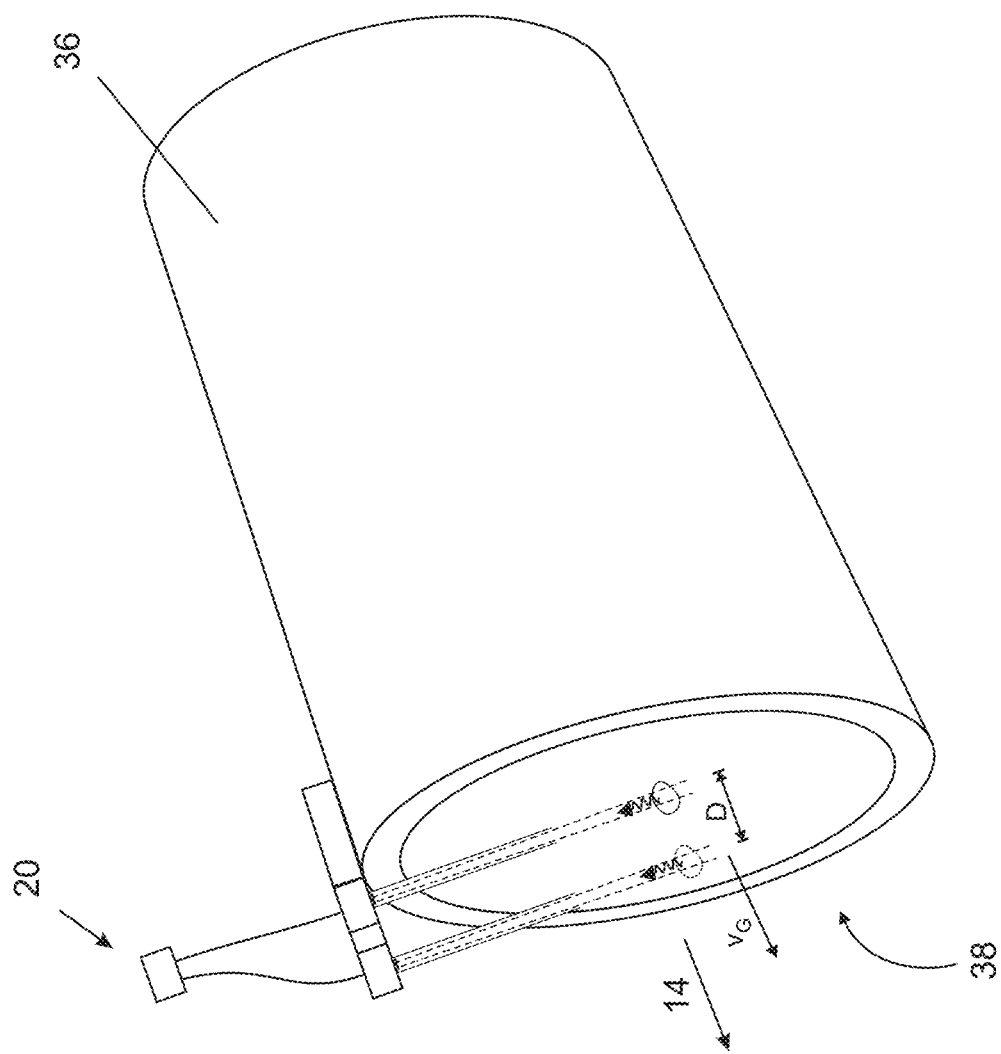

FIG. 2 schematically depicts a jet engine 36 on which the measurement device 20 is arranged in such a way that the gas stream 14, which in this case leaves the jet engine 36 through an outflow opening 38, is measured.

FIG. 3 schematically shows part of an electric arc furnace 40 with a melting chamber 42 in which steel scrap is melted by means of an electric arc between electrodes 43.1, 43.2, 43.3, thereby creating a metal bath 16. On the right-hand side of the image is an enlargement of the area outlined with a dashed line. Exhaust gases produced by melting form the gas stream 14 and are discharged through the pipe 18. The pipe 18 has an annular gap 44 through which air 46 can also enter the pipe 18. In order to measure the gas stream 14, the measurement device 20 is arranged on the gap side of the pipe 18.

REFERENCE LIST 10 furnace
12 burner
14 gas stream
16 metal bath
18 pipe
20 measurement device
22 IR radiation sensor
24 IR radiation bundle
25 measuring line
26 molecule
28 IR photon
30 sensor element
32 evaluation unit
34 wall
36 jet engine
38 outflow opening
40 electric arc furnace
42 melting chamber
43 electrode
44 annular gap
46 air
$\lambda_{min}$ upper cut-off wavelength
$\lambda_{max}$ lower cut-off wavelength
$\lambda_{g1}$ first gas excitation wavelength
$\lambda_{g2}$ second gas excitation wavelength
τ transition time
A cross-sectional area
C concentration
D diameter
d measuring distance
E irradiance
E(t) IR radiation parameter curve
$f_{mess}$ measurement frequency
$f_{g1}$ first gas excitation wavelength
$f_{g2}$ second gas excitation wavelength
M measurement interval, measurement range
VG flow velocity
T temperature
t time
$U_1$ photovoltage

The invention claimed is:

1. A method for measuring a flow velocity of a gas stream featuring the steps:
   (a) time-resolved measurement of an IR radiation parameter of IR radiation of the gas stream at a first measurement point outside of the gas stream, thereby obtaining a first IR radiation parameter curve,
   (b) time-resolved measurement of an IR radiation parameter at a second measurement point outside of the gas stream, thereby obtaining a second IR radiation parameter curve,
   (c) calculation of a transit time from the first IR radiation parameter curve and the second IR radiation parameter curve, and
   (d) calculation of the flow velocity from the transit time,
   (e) wherein the gas stream is a stream of a gas mixture that contains a first gas and at least a second gas,
   (f) wherein a temperature of the gas stream is at least 1000° C.,
   (g) wherein gas stream flows in a pipe and contains particles, the walls of the pipe and the particles emitting black body radiation that is measured by means of a photo detector,
   (h) the IR radiation parameter is measured photoelectrically by means of the photo detector in a wavelength interval between 1.5 μm and 15 μm and at a measurement frequency is at least 1 kilohertz,
   (i) the IR radiation parameter is the irradiance of the infrared radiation caused by the IR radiation emitted by the gas stream due to the temperature of the gas stream.

2. The method according to claim 1, wherein the IR radiation parameter is measured by means of an InAsSb photo detector.

3. The method according to claim 1, wherein the IR radiation does not pass through a lens before hitting the IR radiation sensors.

4. The method according to claim 1, further comprising directing the gas stream through the pipe so that a turbulent gas stream is caused.

5. The method according to claim 1, wherein at least one of the gases in the gas stream has an excitation wavelength above 1.5 μm.

6. The method according to claim 1, wherein the IR radiation sensors are arranged at such a distance from the gas stream that the temperature at that point is at most 100° C.

7. The method of claim 1 wherein the calculation of the transit time of step (c) is performed by cross-correlation.

8. An evaluation unit for a device for measuring a flow velocity of a gas stream that contains of a gas mixture that contains a first gas and at least a second gas and particles and flows in a pipe, wherein the evaluation unit is configured to automatically conduct a method according to claim 1.

9. A method for measuring a flow velocity of a gas stream, comprising:
   (a) time-resolved measurement of an IR radiation parameter of IR radiation of the gas stream at a first measurement point outside of the gas stream, thereby obtaining a first IR radiation parameter curve,
   (b) time-resolved measurement of the IR radiation parameter at a second measurement point outside of the gas stream, thereby obtaining a second IR radiation parameter curve,
   (c) calculation of a transit time from the first IR radiation parameter curve and the second IR radiation parameter curve by means of cross-correlation, and
   (d) calculation of a flow velocity from the transit time, wherein the IR radiation parameter is measured photoelectrically at a wavelength of at least 780 nm, and
   (e) a measurement frequency is at least 1 kilohertz
   (f) wherein the gas stream is a stream of a gas mixture that contains a first gas and at least a second gas, wherein the first gas has a first gas excitation wavelength and (g) the IR radiation parameter is an irradiance at the first gas excitation wavelength,
(h) wherein the second gas has a second gas excitation wavelength and
(i) time-resolved detection of a second IR radiation parameter in the form of an irradiance at the second gas excitation wavelength at the first measurement point, thereby obtaining a first irradiance curve,
(j) time-resolved detection of the second IR radiation parameter at the second measurement point, thereby obtaining a second irradiance curve,
(k) calculation of a second transit time between the irradiances by means of cross-correlation, and
(l) calculation of the flow velocity from the first transit time and the second transit time.

10. A device for measuring a flow velocity of a gas stream that contains of a gas mixture that contains a first gas and at least a second gas and particles and flows in a pipe with:
(a) a first IR radiation sensor for the time-resolved measurement of a first IR radiation parameter of IR radiation of the gas stream to obtain a first IR radiation parameter curve,
(b) a second IR radiation sensor for the time-resolved measurement of the IR radiation parameter of IR radiation of the gas stream to obtain a second IR radiation parameter curve, and
(c) an evaluation unit that is designed to automatically calculate a transit time between the first IR radiation parameter curve and the second IR radiation parameter curve and
calculate the flow velocity from the transit time,
(d) wherein the IR radiation sensors
are photoelectric IR radiation sensors and
have a measurement range M whose lower cut-off wavelength is at least 1.5 µm and an upper cut-off wavelength at most 15 µm,
(e) the IR radiation sensors have a measurement frequency of at least 1 kilohertz,
(f) the IR radiation sensors are photoelectrical sensors with a wavelength interval between 1.5 µm and at most 15 µm and
(g) the device is configured to measure the flow velocity based on the irradiance of the infrared radiation caused by the IR radiation emitted by the gas stream.

11. The device according to claim 10, wherein the IR radiation sensors are not sensitive below 780 nm.

12. The device according to claim 10, wherein the IR radiation sensors are InAsSb photo detectors.

13. The device according to claim 10 wherein1821
a pipe for conducting the gas stream, wherein the first IR radiation sensor and the second IR radiation sensor are arranged to detect IR radiation from the pipe, or
an outflow or through-flow opening, wherein the first IR radiation sensor and the second IR radiation sensor are arranged to detect IR radiation of the gas stream flowing out of the outflow opening.

14. The device according to claim 10 wherein the evaluation unit is configured to perform a calculation of the transit time by cross-correlation.

* * * * *